United States Patent
Lu et al.

(10) Patent No.: US 7,447,220 B2
(45) Date of Patent: Nov. 4, 2008

(54) METHODS AND SYSTEMS FOR PACKET CLASSIFICATION WITH IMPROVED MEMORY UTILIZATION IN A MEDIA GATEWAY

(75) Inventors: David Zhuo Lu, Dallas, TX (US); Yen Shei, Plano, TX (US)

(73) Assignee: Santera Systems, LLC, Plano, TX (US)

( * ) Notice: Subject to any disclaimer, the term of this patent is extended or adjusted under 35 U.S.C. 154(b) by 606 days.

(21) Appl. No.: 11/031,101

(22) Filed: Jan. 7, 2005

(65) Prior Publication Data

US 2006/0077989 A1    Apr. 13, 2006

Related U.S. Application Data

(60) Provisional application No. 60/616,651, filed on Oct. 7, 2004.

(51) Int. Cl.
H04L 12/28 (2006.01)

(52) U.S. Cl. .................. 370/401; 370/389; 370/352

(58) Field of Classification Search .............. None
See application file for complete search history.

(56) References Cited

U.S. PATENT DOCUMENTS

| | | | |
|---|---|---|---|
| 6,061,348 A | 5/2000 | Castrigno et al. | |
| 6,633,563 B1 | 10/2003 | Lin et al. | |
| 6,714,535 B1 | 3/2004 | Herh | |
| 6,771,673 B1 | 8/2004 | Baum et al. | |
| 6,879,667 B1 | 4/2005 | Carew et al. | |
| 6,888,807 B2 * | 5/2005 | Heller et al. | 370/328 |
| 6,901,052 B2 * | 5/2005 | Buskirk et al. | 370/235 |
| 7,177,943 B1 | 2/2007 | Temoshenko et al. | |
| 7,185,094 B2 | 2/2007 | Marquette et al. | |
| 7,212,519 B2 | 5/2007 | Johnson et al. | |
| 7,289,480 B2 * | 10/2007 | Lundstrom et al. | 370/338 |
| 2002/0006780 A1 * | 1/2002 | Bjelland et al. | 455/406 |
| 2002/0012352 A1 | 1/2002 | Hansson et al. | |
| 2002/0016926 A1 | 2/2002 | Nguyen et al. | |
| 2002/0051464 A1 | 5/2002 | Sin et al. | |
| 2002/0191612 A1 | 12/2002 | Curtis | |
| 2003/0041146 A1 | 2/2003 | Davis et al. | |
| 2003/0118039 A1 | 6/2003 | Nishi et al. | |
| 2003/0142795 A1 | 7/2003 | Gavette et al. | |

(Continued)

OTHER PUBLICATIONS

International Search Report and Written Opinion of the International Searching Authority corresponding to PCT application No. PCT/US05/35890 dated Jul. 20, 2006.

(Continued)

Primary Examiner—Bob A Phunkulh
(74) Attorney, Agent, or Firm—Jenkins, Wilson, Taylor & Hunt, P.A.

(57) ABSTRACT

Methods and systems for classifying incoming and/or outgoing packets to sessions in a media gateway store session identifiers for active sessions in a media gateway in a memory. Each session identifier is a combination of a local network address, a local port number, a remote network address, and a remote port number for the session. Alternatively, each session identifier is a combination of a local network address and a local port number. An incoming and/or outgoing packet is classified to one of the active sessions by using network address and port number information from the packet to perform a lookup for a corresponding session identifier in the memory.

42 Claims, 11 Drawing Sheets

U.S. PATENT DOCUMENTS

| | | | |
|---|---|---|---|
| 2003/0235184 A1* | 12/2003 | Dorenbosch et al. | 370/352 |
| 2004/0066782 A1 | 4/2004 | Nassar | |
| 2005/0007954 A1 | 1/2005 | Sreemanthula et al. | |
| 2005/0074017 A1 | 4/2005 | Qian et al. | |
| 2005/0111382 A1 | 5/2005 | Le et al. | |
| 2007/0083528 A1 | 4/2007 | Matthews et al. | |

OTHER PUBLICATIONS

Office Action for U.S. Patent Application No. 10/676,233 (Nov. 28, 2007).

Office Action for U.S. Patent Application No. 10/676,233 (Jun. 11, 2007).

International Search Report and Written Opinion for International Application No. PCT/US04/31920 (Mar. 4, 2005).

International Search Report and Written Opinion for International Application No. PCT/US04/31918 (Feb. 11, 2005).

Yoo et al., "A Media Stream Processing of VoIP Media Gateway," IEEE, pp. 91-94 (2003).

* cited by examiner

METHODS AND SYSTEMS FOR PACKET CLASSIFICATION WITH IMPROVED MEMORY UTILIZATION IN A MEDIA GATEWAY

RELATED APPLICATIONS

This application claims the benefit of U.S. Provisional Application No. 60/616,651 entitled "Media Gateway Features", filed Oct. 7, 2004, which is incorporated herein by reference in its entirety.

TECHNICAL FIELD

The subject matter described herein relates to packet classification to sessions in a media gateway. More particularly, the subject matter described herein includes methods and systems for packet classification in a manner that improves memory utilization in a media gateway.

BACKGROUND

In modern telephony networks, media switching and call control functionality are separated. Call control, which includes setting up and tearing down calls and maintaining call state machines, is performed by a network entity referred to as a media gateway controller (MGC). Media stream switching, which includes switching media packets between input and output ports and converting the media packets into the appropriate formats for the sending and receiving parties, is performed by a media gateway (MG). Media gateway controllers communicate call control information to media gateways via a media gateway control protocol. Typical media gateway control protocols, such as MGCP and MEGACO, include commands for communicating information about each endpoint of a session to the media gateway and instructing the media gateway as to how to process packets to be delivered to each endpoint.

FIG. 1 is a schematic diagram illustrating voice sessions between media gateways 100, 102, 104, 106 interconnected through an IP network 108. Media gateways 100, 102, 104, and 106 may be connected through IP network 108 via multiple paths through a series of next-hop routers. Multiple bidirectional voice sessions may be set up between any two or more of media gateways 100, 102, 104, and 106. As voice packets are received at a media gateway (ingress packets) or exit the media gateway (egress packets), the particular session that a packet belongs to must be identified for proper delivery and/or processing of the packet. The process of assigning a packet to a particular session to which it belongs is referred to herein as packet classification.

FIG. 2 is a schematic diagram illustrating an exemplary media gateway 200. Referring to FIG. 2, media gateway 200 includes a control module 202, a resource manager 204, a packet switch fabric 206, voice servers 208, and network interfaces 210. Each voice server 208 contains voice processing resources for processing VoIP and TDM voice streams. For example, each voice server 208 may include codecs, VoIP, ATM, and TDM chips, and digital signal processing resources for processing VoIP streams. A detailed description of exemplary resources that may be found in voice server 208 can be found in commonly assigned, co-pending U.S. patent application Ser. No. 10/676,233, the disclosure of which is incorporated herein by reference in its entirety.

Voice servers 208 are each reachable through packet switch fabric 206 via any of network interfaces 210. Multiple sessions may be assigned to the same voice server 208. Each session is associated with a different IP address and user datagram protocol (UDP) port number combination. Put simply, UDP ports provide a software mechanism for distinguishing among multiple processes, such as voice sessions, executing on a single host, such as voice server 208. UDP operates at OSI Layer 4.

Control module 202 of media gateway 200 controls the overall operation of media gateway 200 and communicates with media gateway controller 212 to set up and tear down calls. Resource manager 204 of control module 202 allocates new voice sessions to incoming calls. For example, resource manager 204 may assign one of voice servers 208 to a session and store session information for the session in a session table 214 in a memory. Session table 214 is then regularly accessed to classify ingress and egress packets to the appropriate sessions. Although session table 214 is shown logically as a single entity, session tables 214 may actually be distributed among, and accessed by, network interfaces 210, or packet switch fabric 206, as will be discussed further below.

The memory used to store session tables 214 is typically a content addressable memory (CAM). A CAM is preferred because it provides reduced search time as compared to more conventional memory, such as RAM. Consequently, increased packet processing speeds can be realized by using CAM. Due to the automatic parallel search capability employed, a CAM can search its entire memory in a single operation. In short, a CAM can efficiently perform a search based on data content stored anywhere in its memory and without the need to know the particular address in memory of the stored data. There are, however, trade-offs associated with the use of CAM, such as increased expense and increased physical space requirements. Unlike RAM, which has simple storage cells, each individual memory in a CAM typically has its own embedded "match circuit" for allowing parallel searching of all cells simultaneously. In addition, the resulting outputs from the parallel searching of each cell require additional circuitry. This additional circuitry requirement increases the physical size of the content addressable memory chip, which exponentially adds to manufacturing cost. It is therefore advantageous to use content addressable memory efficiently.

Accordingly, a need exists for efficiently storing session information in a content addressable memory for use in packet classification.

SUMMARY

In one aspect of the subject matter disclosed herein, a method is disclosed for classifying incoming and outgoing packets to sessions in a media gateway. Session identifiers for active sessions in a media gateway are stored in a memory. Each session identifier includes a combination of at least a local network address and a local port number for the session. An incoming packet is classified to one of the active sessions by using the destination network address and the destination port number from the packet to perform a lookup for a corresponding session identifier in the memory. An outgoing packet is classified to one of the active sessions by using at least the source network address and the source port number to perform a lookup for the same corresponding session identifier in the memory.

In another aspect of the subject matter disclosed herein, a method is disclosed for classifying incoming packets to sessions in a media gateway. Session identifiers for active sessions in a media gateway are stored in a memory. Each session identifier is a combination of a local network address and a local port number for the session. An incoming packet is classified to one of the active sessions by using the destination network address and the destination port number from the packet to perform a lookup for a corresponding session identifier in the memory.

In another aspect of the subject matter disclosed herein, a method is disclosed for classifying outgoing packets to sessions in a media gateway. Session identifiers for active sessions in a media gateway are stored in a memory. Each session identifier is a combination of a local network address and a local port number for the session. An outgoing packet is classified to one of the active sessions by using the source network address and the source port number to perform a lookup for a corresponding session identifier in the memory.

In another aspect of the subject matter disclosed herein, a system is disclosed for classifying incoming and outgoing packets to sessions in a media gateway. The system includes a memory for storing session identifiers for active sessions in a media gateway, each session identifier including a combination of at least a local network address and a local port number for the session. A network processor is operatively associated with the memory for classifying both incoming and outgoing packets to one of the active sessions using a combination of addresses from the packet to perform a lookup for a corresponding session identifier in the memory.

In another aspect of the subject matter disclosed herein, a system is disclosed for classifying incoming packets to sessions in a media gateway. The system includes a memory for storing session identifiers for active sessions in a media gateway, each session identifier being a combination of a local network address and a local port number for the session. A network processor is operatively associated with the memory and includes logic configured to classify incoming packets to one of the active sessions by using a destination network address and a destination port number from the packet to perform a lookup for a corresponding session identifier in the memory.

In another aspect of the subject matter disclosed herein, a system is disclosed for classifying incoming and outgoing packets to sessions in a media gateway. The system includes a memory for storing session identifiers for active sessions in a media gateway, each session identifier being a combination of a local network address, a local port number, a remote network address, and a remote port number for the session. A network processor is operatively associated with the memory for classifying both incoming and outgoing packets to one of the active sessions by using a destination network address, a destination port number, a source network address, and a source port number from the packet to perform a lookup for a corresponding session identifier in the memory.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION OF THE INVENTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action, or alternatively as "logic that" performs a described action.

Figure 1:
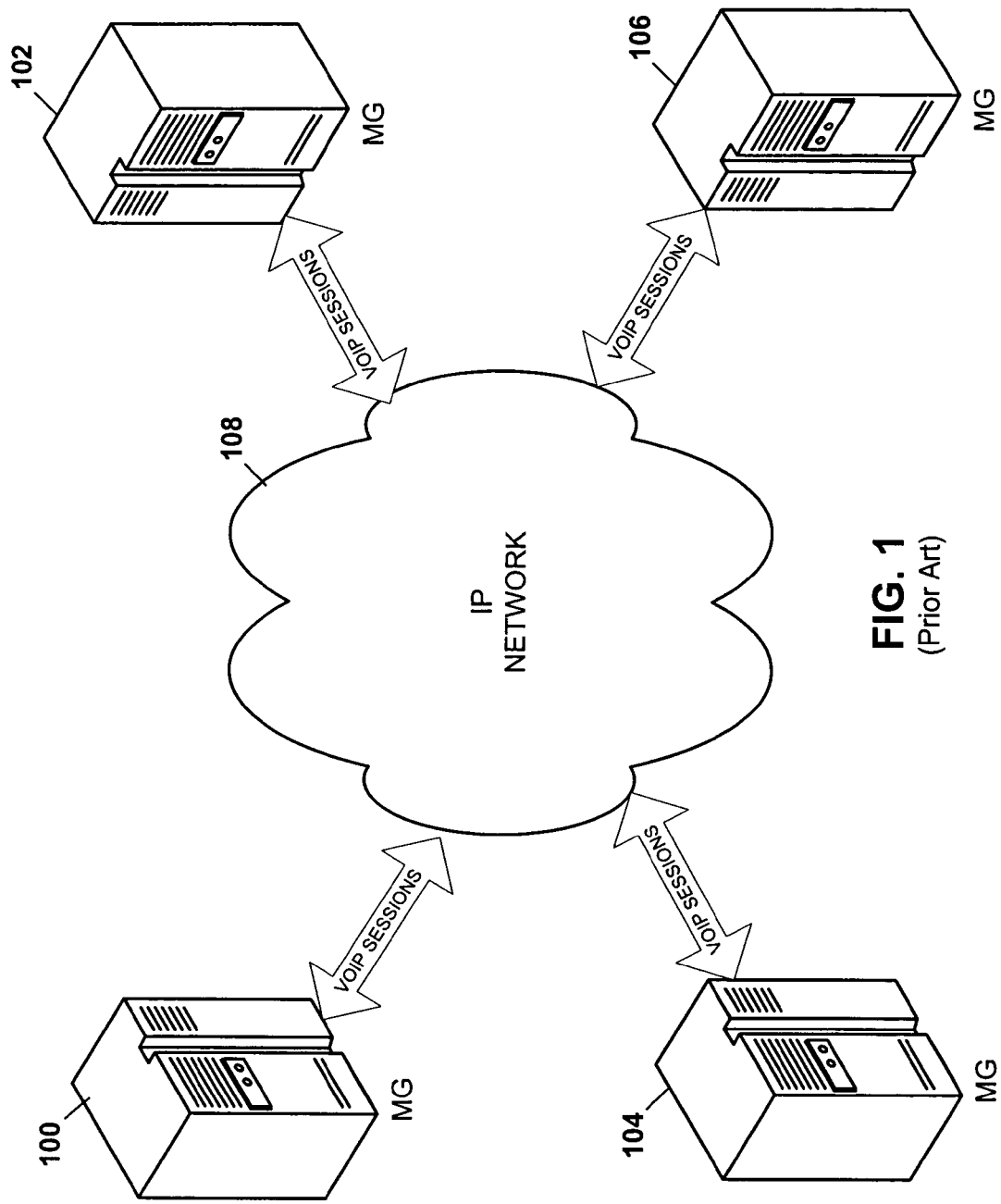
FIG. 1 is a schematic diagram illustrating Voice sessions between media gateways interconnected through an IP network.
Figure 2:
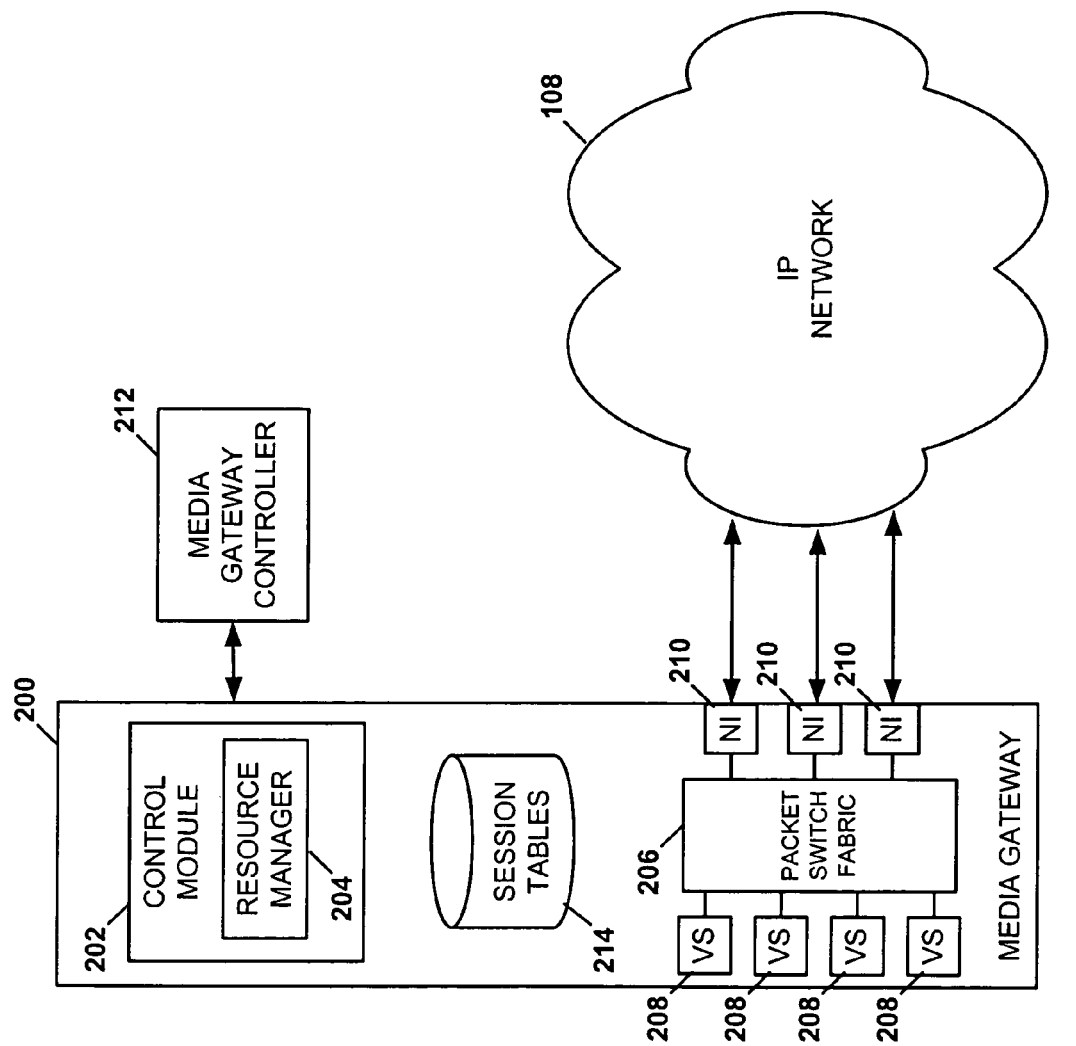
FIG. 2 is a schematic diagram illustrating an exemplary media gateway.
Figure 3:
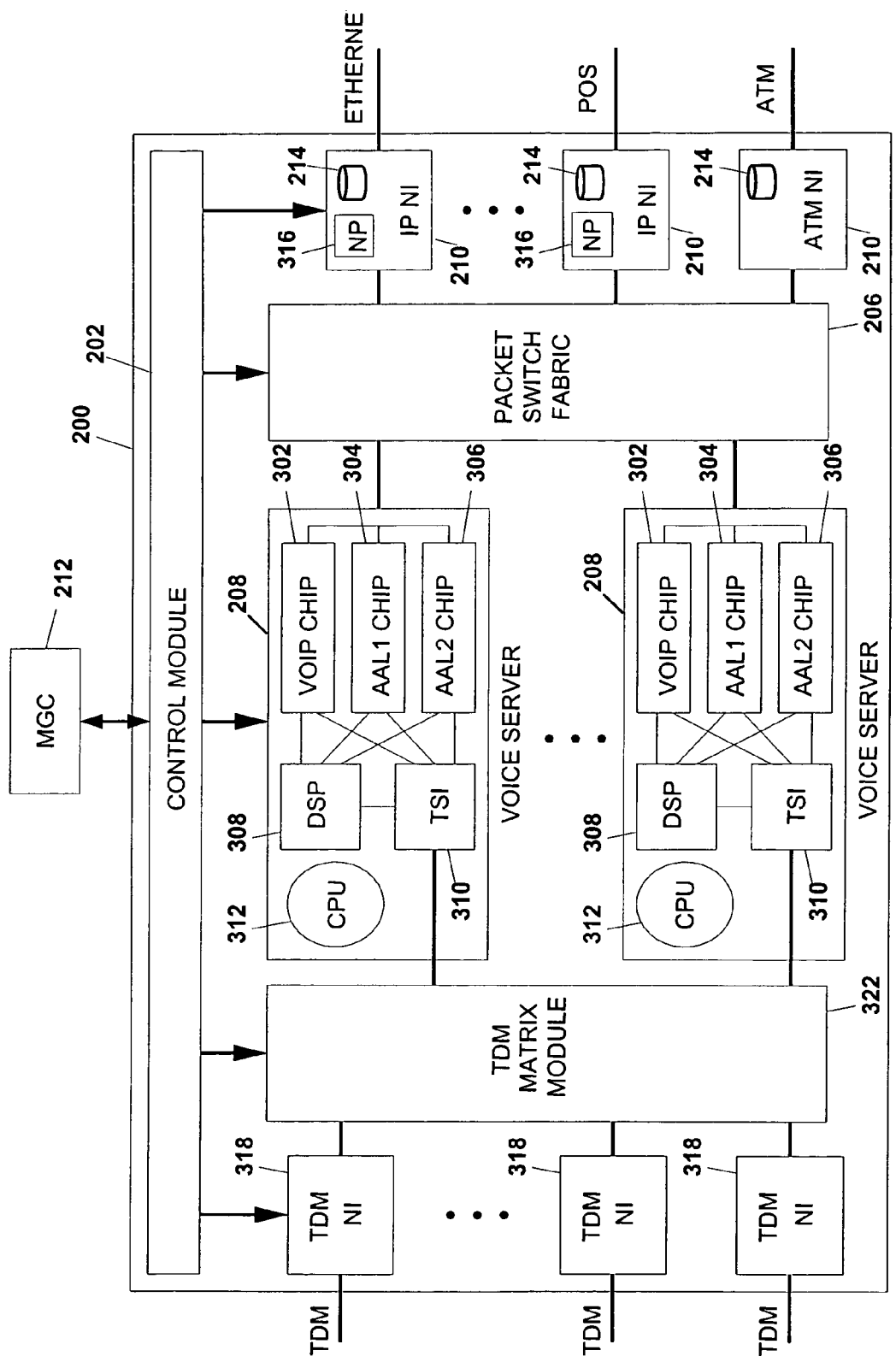
FIG. 3 is a schematic diagram illustrating an exemplary internal architecture for a media gateway.

FIG. 3 is a schematic diagram illustrating an exemplary internal architecture for media gateway 200 in more detail. In FIG. 3, media gateway 200 includes voice servers 208, which include various voice chips, including VoIP chips 302, voice-over-AAL1 chips 304, and voice-over-AAL2 chips 306. In addition, each voice server 208 includes some digital signal processors 308 (e.g. voice transcoders, echo cancellers, conference bridges, etc.), a time slot interconnection (TSI) 310, and a central processing unit (CPU) 312.

In the illustrated example, each voice chip 302 implements one or more VoIP protocols, such as Real time Transmission Protocol (RTP). Each voice chip 304 implements ATM Adaptation Layer 1 (AAL1) functions. Each voice chip 306 implements ATM Adaptation Layer 2 (AAL2) functions. DSP 308 provides transcoding, echo cancellation and other payload-transformation functions. TSI 310 makes on-demand connections between VoIP chip channels, TDM matrix channels, and DSPs. CPU 312 controls the overall operation of each voice server 208.

In addition to a plurality of voice servers 208, media gateway 200 includes a plurality of network interfaces 210. Each network interface 210 implements network layer functions and packet forwarding functions, such as IP forwarding functions. In the illustrated example, different network interfaces are provided to connect to external Ethernet, Packet-Over-SONET (POS), ATM, and MPLS networks.

In addition to packet-based network interfaces 210, media gateway 200 may also include TDM network interfaces 318. TDM network interfaces 318 send and receive voice frames from external TDM networks. TDM network interfaces 318 may implement any suitable physical layer protocols for sending and receiving voice frames over TDM links. For example, each TDM network interface 318 may terminate one or more TDM voice trunks.

In order to switch media packets between network interfaces 210 and voice servers 208, media gateway 200 includes a packet switch fabric 206. Packet switch fabric 206 routes packets between voice servers 208 and network interfaces 210 under the control of control module 202. As discussed above, packet switch fabric 206 may connect every network interface 210 to every voice server 208. In addition to packet switch fabric 206, gateway 200 may also include a TDM matrix module 322 for switching traffic that is carried in each TDM timeslot. TDM matrix module 322 is also controlled by control module 320. Control module 202 may communicate with media gateway controller 212 to dynamically allocate logical and physical resources for each session.

In operation, control module 202 receives a request for a new call/session. The request may be generated by media gateway controller 212 in response to a call setup message associated with a new call. The call setup message may be an ISUP IAM message, a PRI SETUP message, a SIP INVITE message, or any other suitable type of call setup message for initiating a call. Control module 202 assigns a voice server 208 and a voice chip to process the media stream for the session. Control module 202 also identifies the session by instructing network interfaces 210 to add an entry for the session to session tables 214. The session identifier may include a combination of addresses, such as at least one IP address and at least one UDP port number, that is unique among current sessions, as will be described further below. The session identifier is preferably assigned to a voice chip for the duration of the session. The local IP address and UDP port assigned to the session are communicated to the remote end of a session by media gateway controller 212. The remote end of the session will then send subsequent media stream packets that are addressed according to the local IP address and UPD port. Session tables 214 on each packet network interface 210 are used by the network interface to classify packets and forward packets to the appropriate voice session 312.

Once resources, such as a voice chip, have been assigned to the session, media gateway 200 classifies packets having the same session identifier to the session. That is, packets are forwarded via the switch fabric 206 to and from the voice chip assigned to the session for voice processing. Exemplary operations that may be performed by the assigned voice chip may include segmentation and reassembly (SAR), echo cancellation, transcoding, DTMF detection, DTMF generation, announcement, conference bridging, Internet Fax, and law enforcement. Once the voice packets associated with the session have been processed, the voice packets may be sent from the voice chip to one of the packet network interface cards 210 or to a TDM network interface card 318 for transmission to the remote end of a session. Once a session ends, the resources used may be assigned to a new session. An exemplary method for dynamically assigning resources to sessions suitable for use with the methods and systems described herein is described in commonly assigned, co-pending U.S. patent application Ser. No. 10/676,233, referenced above.

Figure 4:
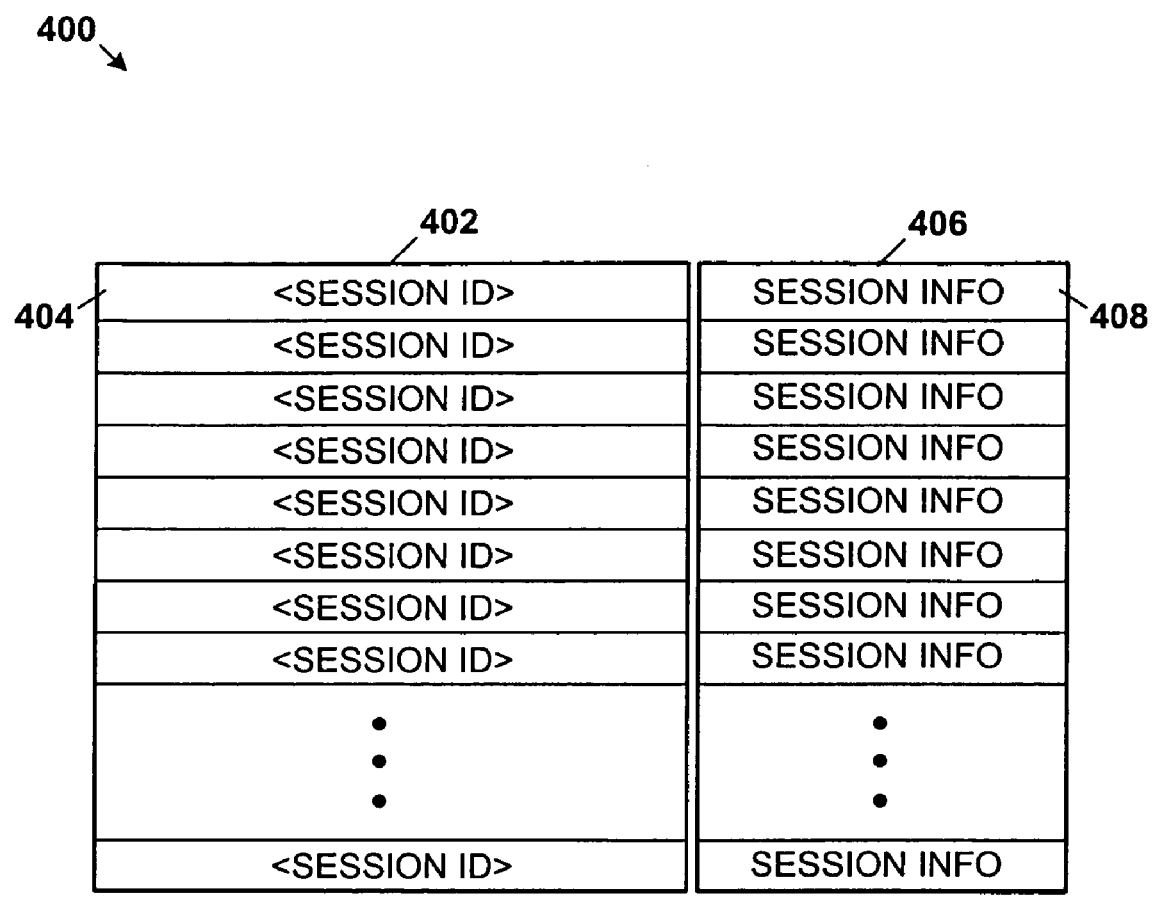
FIG. 4 is a schematic diagram illustrating an exemplary content addressable memory.

As discussed above, the memory for storing session tables 214 may be a CAM, although the techniques described herein can be used with other memory types, such as RAM, DRAM, and the like. FIG. 4 is a schematic diagram illustrating an exemplary CAM 400. In FIG. 4, a CAM 400 includes a search index part 402 for storing search fields 404 and a return data part 406 for storing corresponding return data fields 408. Search index part 402 includes circuitry (not shown) to facilitate parallel searching of all search fields 404. As shown in FIG. 4, when storing session tables 214 in CAM 400, a session ID that identifies the session may be stored in the search fields 404 and other corresponding session information may be stored in returned data fields 408. Session information may include information needed to process packets for the sessions, such as additional identifying information, the type of processing needed, and other such information. Due to the increased circuitry required for searching, search index part 402 is primarily responsible for the added cost and size typically associated with CAM 400 (as compared with other memories). Reducing the number of bits required in each search field, i.e., reducing the width of search index part 402, greatly reduces the size and cost of CAM 400. Accordingly, it is advantageous to minimize the number of bits required for the session ID. Additionally, as would be expected, reducing the number of entries required in session table 214 also reduces the size and cost of CAM 400.

Figure 5:
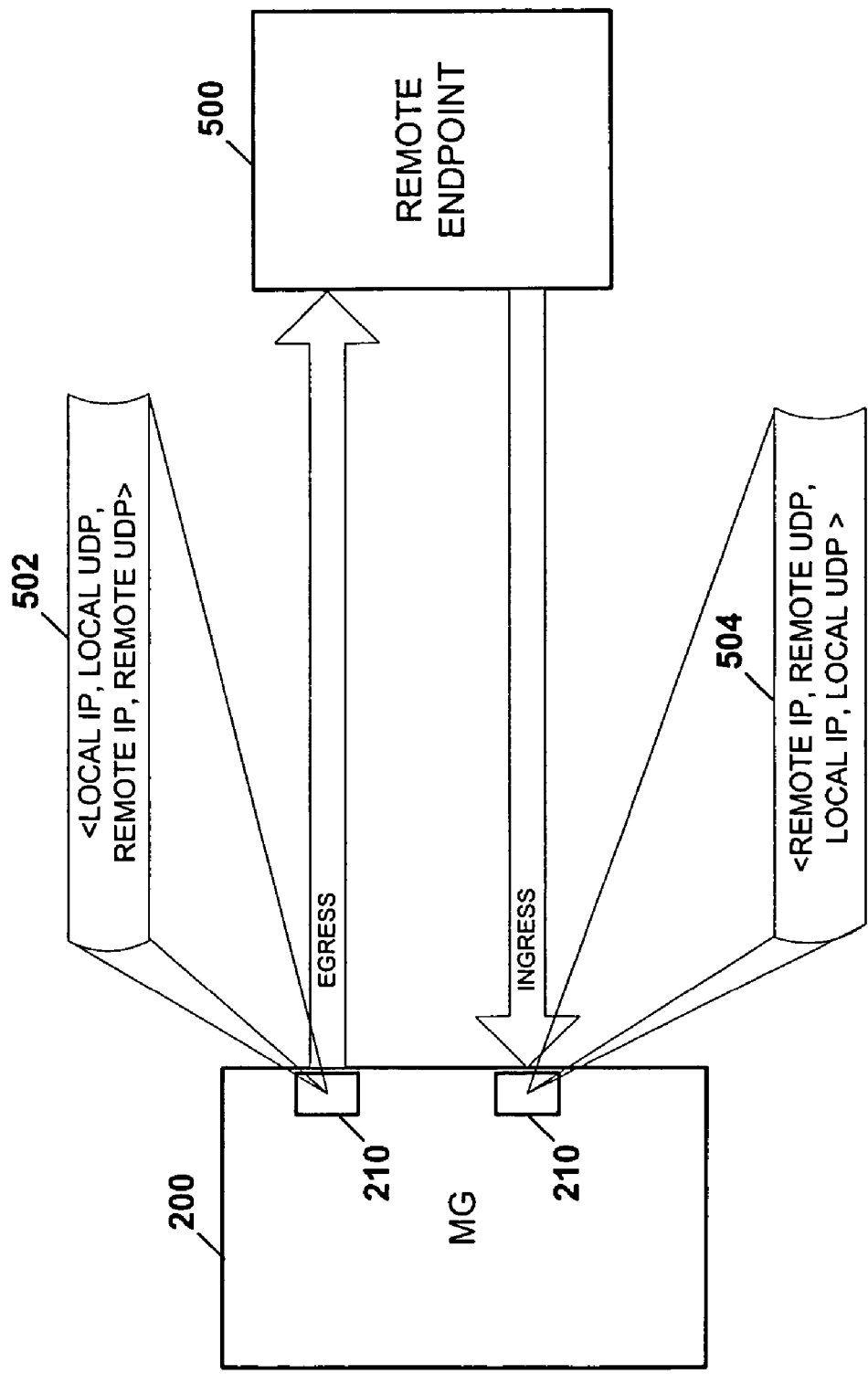
FIG. 5 is a schematic diagram illustrating session identification according to an aspect of the subject matter described herein.

A voice session may be identified by a combination of the destination IP address, destination UDP port number, source IP address, and source UDP port number. The session ID may include all four parameters to identify a session. FIG. 5 is a schematic diagram illustrating session identification according to an aspect of the subject matter described herein. In FIG. 5, media gateway 200 communicates with remote endpoint 500 via one or more voice sessions. Two session tables are maintained for classifying packets, one for egress packets and one for ingress packets. Although two network interfaces 210 are shown, it should be noted that egress packets and ingress packets can arrive and depart from the same network interface 210. When an outgoing packet needs to be classified, the egress session table is searched for a session ID 502 having the following format:

<LOCAL IP, LOCAL UDP, REMOTE IP, REMOTE UDP>

Inversely, when an incoming packet needs to be classified, an ingress session table is searched for a session ID 504 having the following format:

<REMOTE IP, REMOTE UDP, LOCAL IP, LOCAL UDP>

In either case, a packet is either matched to an entry in the associated session table and classified to the corresponding session or no match is found and the packet is not classified.

Using this approach, for each bidirectional voice call, two session table entries are required, one for incoming packets and one for outgoing packets. Each entry requires 96 bits, since IP addresses are 32 bits each and UDP port numbers are 16 bits each. CAMs are typically available with search part field 404 sizes of 64 bits and 128 bits. Accordingly, in this implementation, two 128-bit CAMs are employed and a 4 MB CAM supports 4 MB/(2*128)=16K bi-directional voice sessions.

Figure 6:
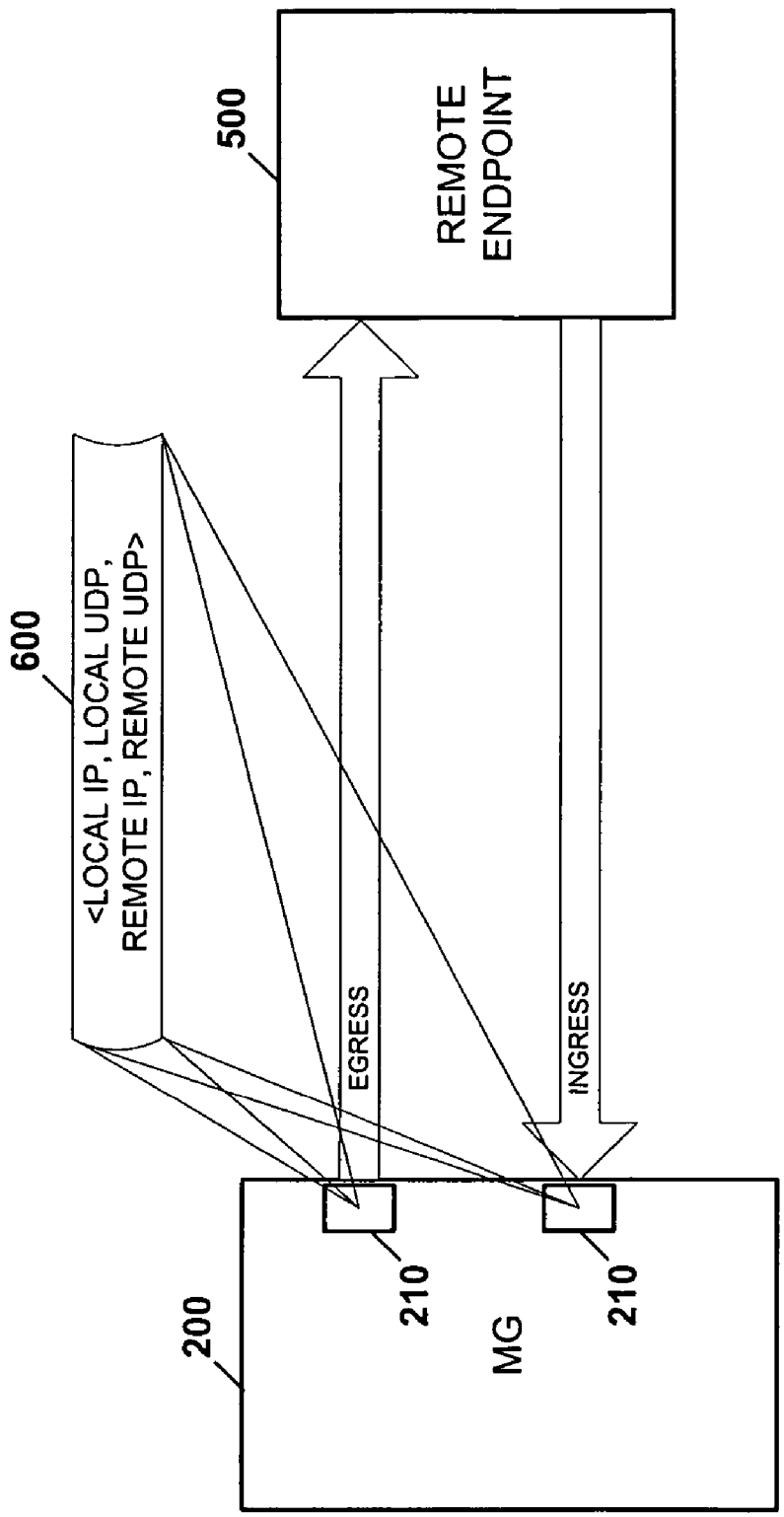
FIG. 6 is a schematic diagram illustrating session identification according to another aspect of the subject matter described herein.

FIG. 6 is a schematic diagram illustrating session identification according to another aspect of the subject matter described herein. In FIG. 6, media gateway 200 again communicates with remote endpoint 500 via one or more voice sessions. In this case however, the same session ID 600 is used for both incoming and outgoing packets of the same call. This approach takes advantage of the symmetry between incoming and outgoing directions of the same call. That is, the source of incoming packets and the destination of outgoing packets are one in the same entity (remote endpoint). Accordingly, a single entry can be placed in one combined ingress/egress session table having the following format for the session ID:

<LOCAL IP, LOCAL UDP, REMOTE IP, REMOTE UDP>

This approach effectively doubles the storage capabilities of CAM used to store session tables. For example, a 4 MB CAM will support 32K bi-directional voice sessions.

Figure 7:
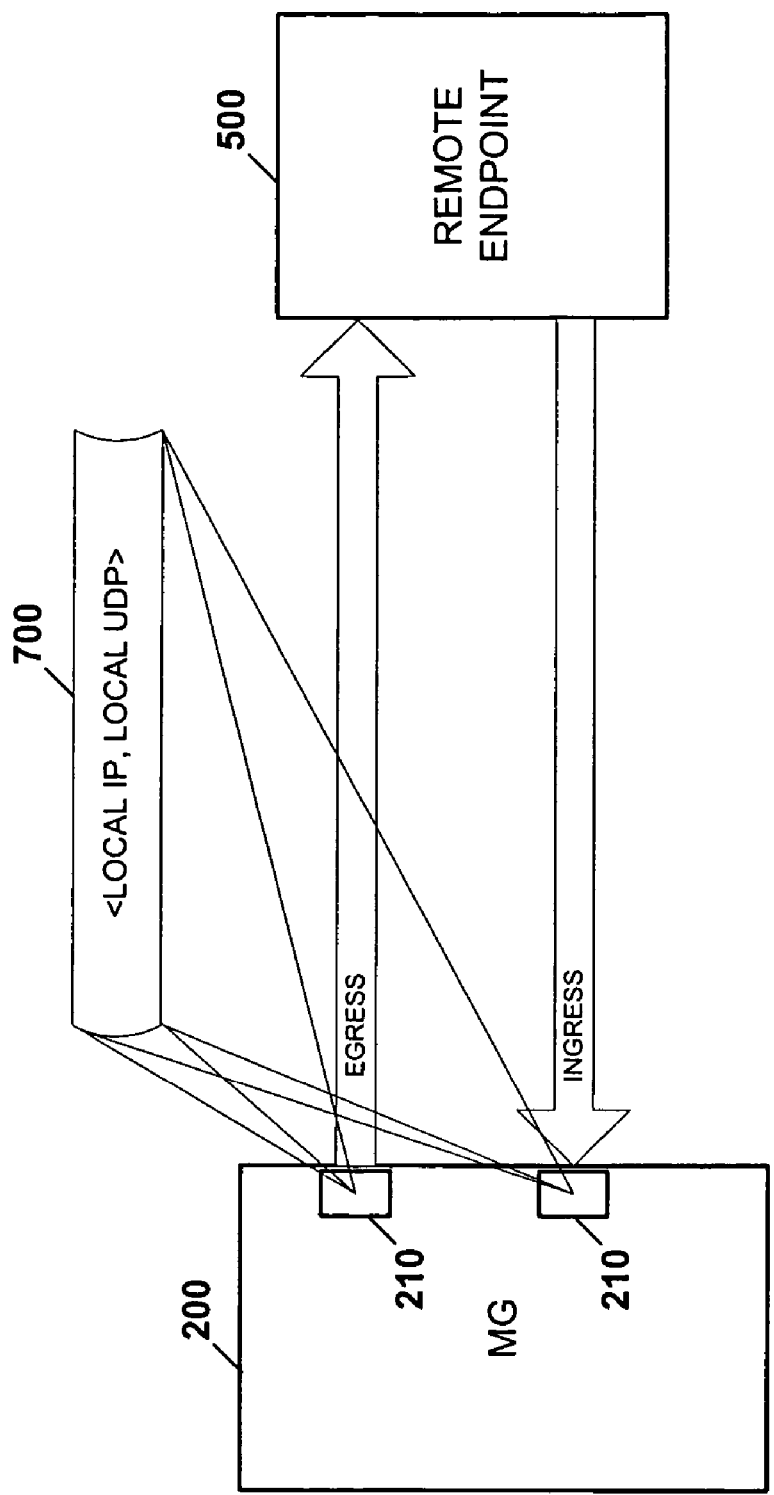
FIG. 7 is a schematic diagram illustrating session identification according to another aspect of the subject matter described herein.

FIG. 7 is a schematic diagram illustrating session identification according to another aspect of the subject matter described herein. In FIG. 7, media gateway 200 again communicates with remote endpoint 500 via one or more voice sessions. Here, sessions are identified by their local IP address and local UDP port number exclusively. This approach takes advantage of the fact that the combination of local IP address and local UDP port number is unique to each session being processed. The format used for a session ID 700 is:

<LOCAL IP, LOCAL UDP>

This approach effectively quadruples the number of concurrent sessions that a fixed-size CAM can handle. For example, a 4 MB CAM will support 64K bidirectional voice calls. In addition, the session ID is reduced in length from 96 bits to 48 bits. This provides the ability to use, for example, a 64-bit wide CAM in place of 128-bit wide CAM.

When performing session identification based on the local IP address and local UDP port number, an optional verification of the remote IP address and remote UDP port number may be carried out according to another aspect of the subject matter described herein. For example, with reference again to FIG. 4, the local IP address and local UDP port number may be stored as a session ID in search index part 402 of CAM 400 and the remote IP address and remote UDP port number may be stored with session information in return data part 406 of CAM 400. When a packet is classified, an associated record is found in session table 214 based on the session ID <LOCAL IP, LOCAL UDP> and the remote IP address and remote UDP port number in the packet is compared with data stored in an associated field in return data part 406 of CAM 400 to verify that the correct the record was found.

Figure 8:
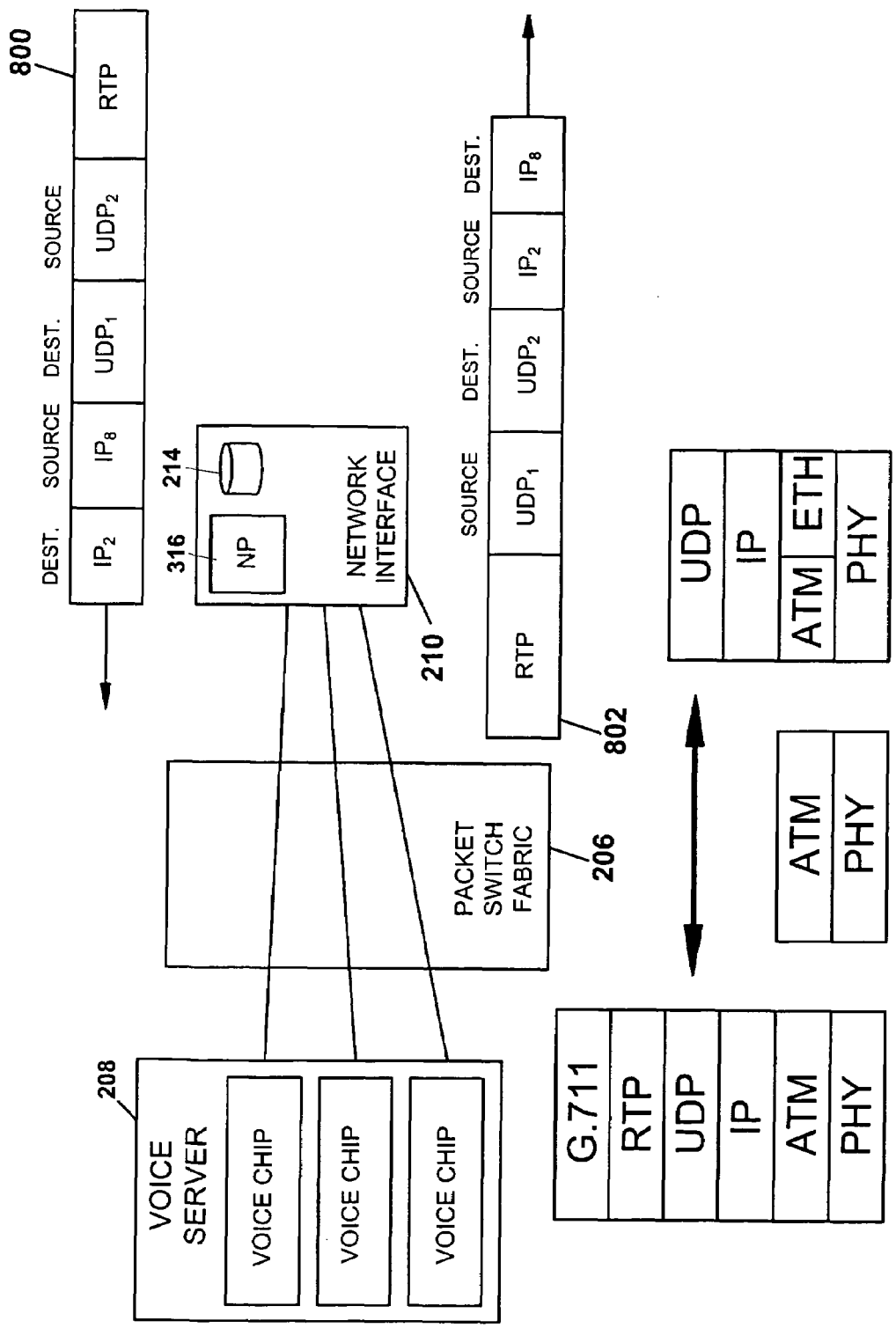
FIG. 8 is a schematic diagram illustrating the forwarding of inbound and outbound packets in more detail according to another aspect of the subject matter described herein.

FIG. 8 is a schematic diagram illustrating the forwarding of inbound and outbound packets in more detail according to another aspect of the subject matter described herein. In FIG. 8, an incoming packet 800 addressed to <$IP_2$, $UDP_1$> arrives at network interface 210. In this example, it is assumed that voice server 208 resources have already been assigned to the session with which incoming packet 800 is associated, and a corresponding entry exists in session table 214. Network interface 210 performs a look up in session table 214 and forwards the packet based on the destination IP address and destination UDP port number combination through packet switch fabric 206 to a voice chip in associated voice server 208. For incoming packets 800, the destination IP address and destination UDP port number in the packet correspond to the local IP address and local UDP port number, respectively. The respective voice chip in voice server 208 processes the packets 800 associated with the session. In the reverse direction, the voice chip generates outbound packets 802 with the source IP address and UDP port number the same as the destination IP address and UDP port number of the incoming packets 800 of the same session. The outgoing packets 802 may also have the same destination IP address and UDP port number as the source IP address and UDP port number of the incoming packets 800 of the same session. Network interface 210 performs a look up in session table 214 and forwards outbound packet 802 based on the source IP address and source UDP port number combination to the next-hop IP address associated with the remote end of the session. For outgoing packets, the source IP address and source UDP port number in the packet correspond to the local IP address and local UDP port number, respectively.

Figure 9:
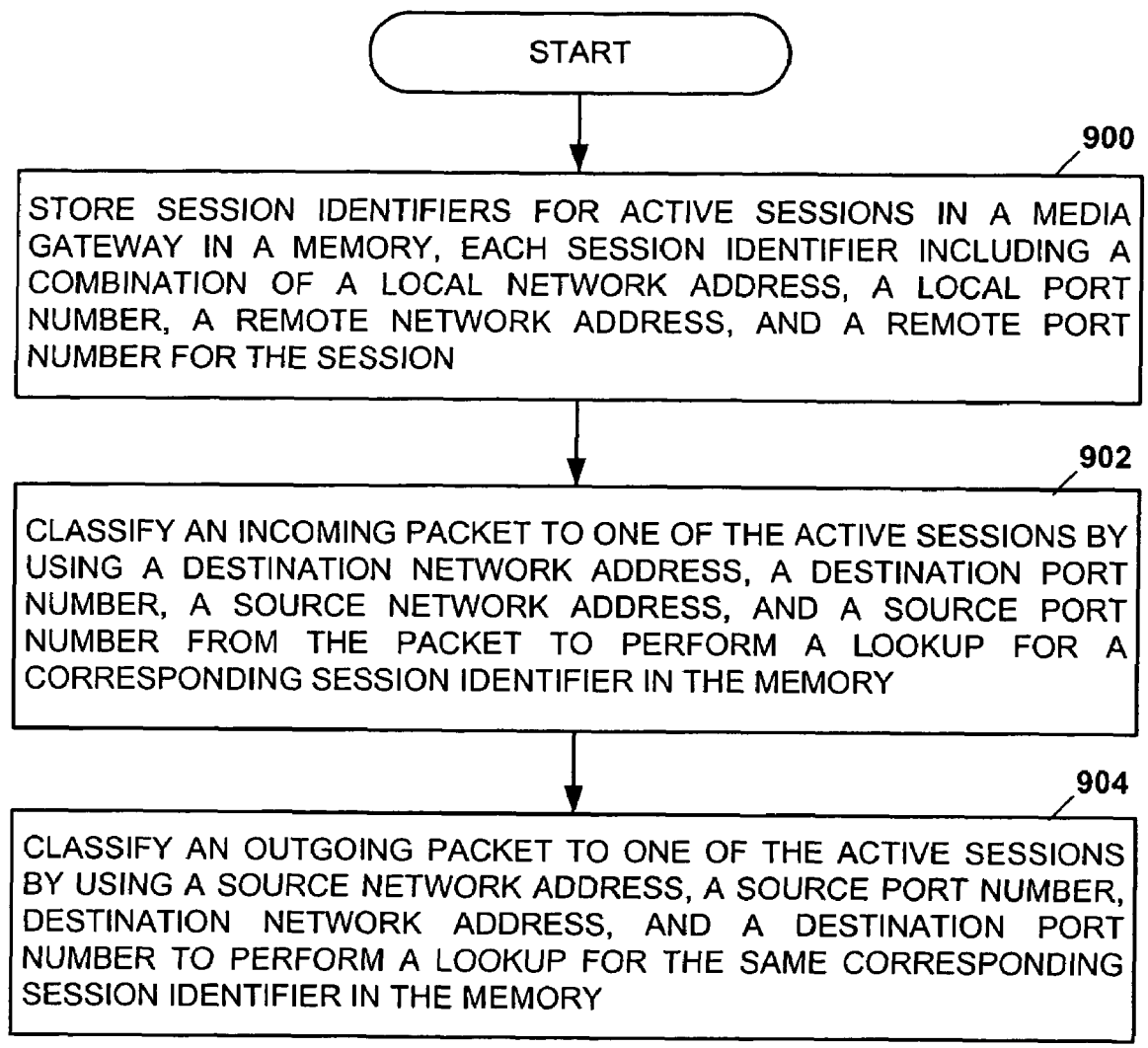
FIG. 9 is a flow chart illustrating a method for classifying incoming and outgoing packets to sessions in a media gateway according to another aspect of the subject matter described herein.

FIG. 9 is a flow chart illustrating a method for classifying incoming and outgoing packets to sessions in a media gateway according to another aspect of the subject matter disclosed herein. In FIG. 9, session identifiers for active sessions in a media gateway are stored in a memory in step 900. Each session identifier includes a combination of a local network address, a local port number, a remote network address, and a remote port number for the session. In step 902, an incoming packet is classified to one of the active sessions by using a destination network address, a destination port number, a source network address, and a source port number from the packet to perform a lookup for a corresponding session identifier in the memory. In step 904, an outgoing packet is classified to one of the active sessions by using a source network address, a source port number, destination network address, and a destination port number to perform a lookup for the same corresponding session identifier in the memory.

Figure 10:
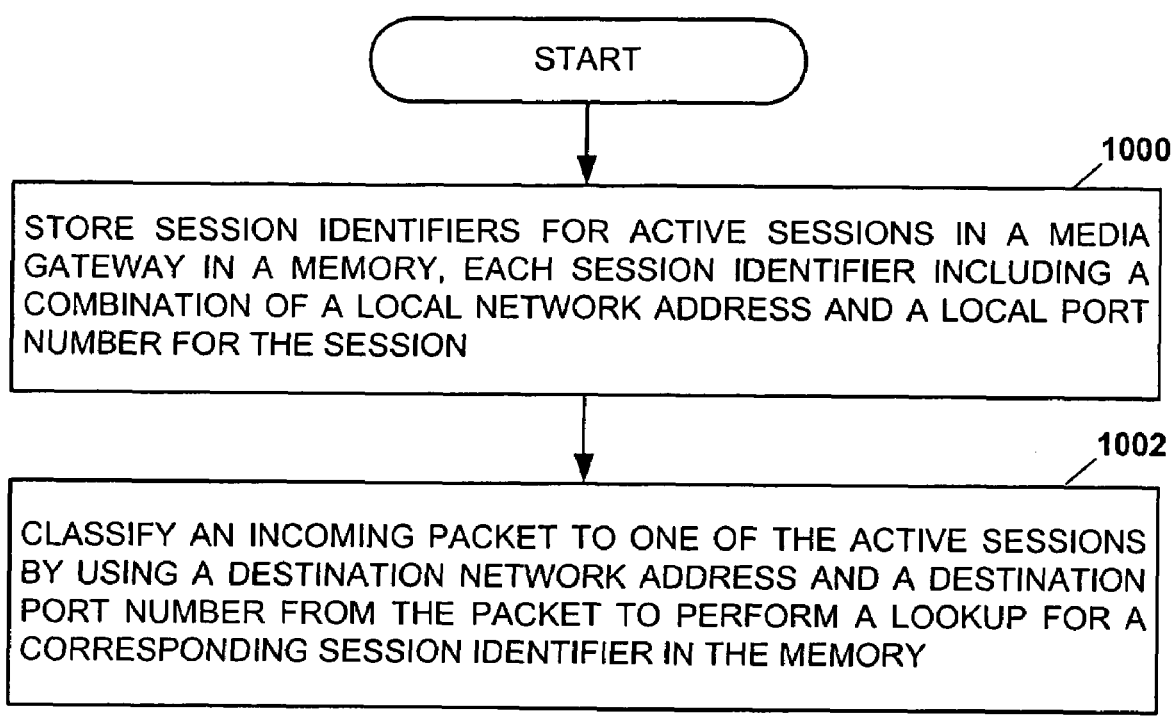
FIG. 10 is a flow chart illustrating a method for classifying incoming packets to sessions in a media gateway according to another aspect of the subject matter described herein.

FIG. 10 is a flow chart illustrating a method for classifying incoming packets to sessions in a media gateway according to another aspect of the subject matter described herein. In FIG. 10, session identifiers for active sessions in a media gateway are stored in a memory in step 1000. Each session identifier includes a combination of a local network address and a local port number for the session. In step 1002, an incoming packet is classified to one of the active sessions by using a destination network address and a destination port number from the packet to perform a lookup for a corresponding session identifier in the memory.

Figure 11:
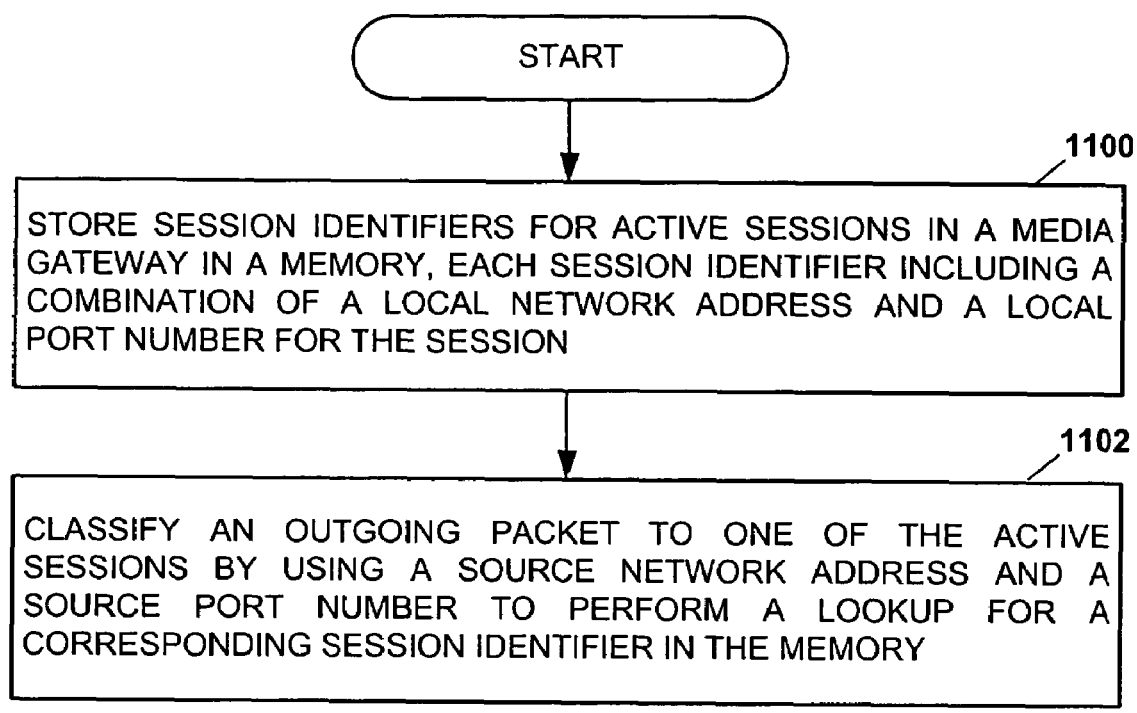
FIG. 11 is a flow chart illustrating a method for classifying outgoing packets to sessions in a media gateway according to another aspect of the subject matter described herein.

FIG. 11 is a flow chart illustrating a method for classifying outgoing packets to sessions in a media gateway according to another aspect of the subject matter described herein. In FIG. 11, session identifiers for active sessions in a media gateway are stored in a memory in step 1100. Each session identifier includes a combination of a local network address and a local port number for the session. In step 1102, an outgoing packet is classified to one of the active sessions by using a source network address and a source port number to perform a lookup for a corresponding session identifier in the memory.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for classifying incoming packets to sessions in a media gateway, the method comprising:
   at a network interface in a media gateway:
   (a) storing session identifiers for active sessions in the media gateway in a memory, each session identifier being a combination of a local network address and a local port number for the active session; and
   (b) classifying an incoming packet to one of the active sessions by using a destination network address and a destination port number from the packet to perform a lookup for a corresponding session identifier in the memory.

2. The method of claim 1 wherein each session identifier in the memory consists exclusively of the local network address and the local port number.

3. The method of claim 1 wherein the local network address is an IP address and the local port number is a UDP port number.

4. The method of claim 1 wherein storing session identifiers for active sessions in a media gateway in a memory comprises storing session identifiers in a content addressable memory.

5. The method of claim 1 wherein classifying incoming packets to one of the active sessions comprises retrieving information about the session, the information being associated with the session identifier.

6. The method of claim 5 wherein the retrieved information comprises a remote network address and a remote port number associated with the session.

7. The method of claim 6 comprising verifying that the remote network address and the remote port number associated with the session corresponds to a source network address and a source port number of the packet.

8. The method of claim 1 comprising classifying an outgoing packet to one of the active sessions.

9. The method of claim 1 wherein each session identifier is assigned to a voice chip in the media gateway for a duration of the active session.

10. A method for classifying outgoing packets to sessions in a media gateway, the method comprising:
    at a network interface in a media gateway:
    (a) storing session identifiers for active sessions in the media gateway in a memory, each session identifier being a combination of a local network address and a local port number for the active session; and
    (b) classifying an outgoing packet to one of the active sessions by using a source network address and a source port number from the outgoing packet to perform a lookup for a corresponding session identifier in the memory.

11. The method of claim 10 wherein each session identifier in the memory consists exclusively of the local network address and the local port number.

12. The method of claim 10 wherein the local network address is an IP address and the local port number is a UDP port number.

13. The method of claim 10 wherein storing session identifiers for active sessions in a media gateway in a memory comprises storing session identifiers in a content addressable memory.

14. The method of claim 10 wherein classifying outgoing packets to one of the active sessions comprises retrieving information about the session, the information being associated with the session identifier.

15. The method of claim 14 wherein the retrieved information comprises a remote network address and a remote port number associated with the session.

16. The method of claim 15 comprising verifying that the remote network address and the remote port number associated with the session corresponds to a destination network address and a destination port number of the packet.

17. The method of claim 10 comprising classifying an incoming packet to one of the active sessions.

18. The method of claim 10 wherein each session identifier is assigned to a voice chip in the media gateway for a duration of the active session.

19. A method for classifying incoming and outgoing packets to sessions in a media gateway, the method comprising:
    at a network interface in a media gateway:
    (a) storing session identifiers for active sessions in the media gateway in a memory, each session identifier including a combination of at least a local network address and a local port number for the active session;
    (b) classifying an incoming packet to one of the active sessions by using at least a destination network address and a destination port number from the packet to perform a lookup for a corresponding session identifier in the memory; and
    (c) classifying an outgoing packet to one of the active sessions by using at least a source network address and a source port number to perform a lookup for the same corresponding session identifier in the memory.

20. The method of claim 19 wherein storing session identifiers for active sessions in a media gateway in a memory comprises storing session identifiers in a content addressable memory.

21. The method of claim 19 wherein each session identifier is assigned to a voice chip in the media gateway for a duration of the active session.

22. A system for classifying incoming packets to sessions in a media gateway, the system comprising:
    (a) a memory for storing session identifiers for active sessions in a media gateway, each session identifier being a combination of a local network address and a local port number for the session active session; and
    (b) a network processor operatively associated with the memory and including logic configured to classify incoming packets to one of the active sessions by using a destination network address and a destination port number from the packet to perform a lookup for a corresponding session identifier in the memory, wherein the memory and the network processor are located at a network interface in the media gateway.

23. The system of claim 22 wherein each session identifier in the memory consists exclusively of the local network address and the local port number.

24. The system of claim 22 wherein the local network address is an IP address and the local port number is a UDP port number.

25. The system of claim 22 wherein the memory is a content addressable memory.

26. The system of claim 22 wherein the network processor includes logic configured to retrieve information about the session from the memory, the information being associated with the session identifier.

27. The system of claim 26 wherein the retrieved information comprises a remote network address and a remote port number associated with the session.

28. The system of claim 27 wherein the network processor includes logic configured to verify that the remote network address and the remote port number associated with the session corresponds to a source network address and a source port number of the packet.

29. The system of claim 22 wherein the network processor includes logic configured to classify outgoing packets by performing a lookup in the memory.

30. The system of claim 22 wherein each session identifier is assigned to a voice chip in the media gateway for a duration of the active session.

31. A system for classifying outgoing packets to sessions in a media gateway, the system comprising:
   (a) a memory for storing session identifiers for active sessions in a media gateway, each session identifier being a combination of a local network address and a local port number for the session active session; and
   (b) a network processor operatively associated with the memory for classifying outgoing packets to one of the active sessions by using a source network address and a source port number to perform a lookup for a corresponding session identifier in the memory, wherein the memory and the network processor are located at a network interface in the media gateway.

32. The system of claim 31 wherein each session identifier in the memory consists exclusively of the local network address and the local port number.

33. The system of claim 31 wherein the local network address is an IP address and the local port number is a UDP port number.

34. The system of claim 31 wherein the memory is a content addressable memory.

35. The system of claim 31 wherein the network processor includes logic configured to retrieve information about the session from the memory, the information being associated with the session identifier.

36. The system of claim 35 wherein the retrieved information comprises a remote network address and a remote port number associated with the session.

37. The system of claim 36 wherein the network processor includes logic configured to verify that the remote network address and the remote port number associated with the session corresponds to a destination network address and a destination port number of the packet.

38. The system of claim 31 wherein the network processor includes logic configured to classify incoming packets by performing a lookup in the memory.

39. The system of claim 31 wherein each session identifier is assigned to a voice chip in the media gateway for a duration of the active session.

40. A system for classifying incoming and outgoing packets to sessions in a media gateway, the system comprising:
   (a) a memory for storing session identifiers for active sessions in a media gateway, each session identifier including a combination of at least a local network address and a local port number for the session active session; and
   (b) a network processor operatively associated with the memory for classifying both incoming and outgoing packets to one of the active sessions using a combination of addresses from each packet to perform a lookup for a corresponding session identifier in the memory, wherein the memory and the network processor are located at a network interface in the media gateway.

41. The system of claim 40 wherein the memory is a content addressable memory.

42. The system of claim 40 wherein each session identifier is assigned to a voice chip in the media gateway for a duration of the active session.

* * * * *